United States Patent [19]
Snyder

[11] Patent Number: 5,519,943
[45] Date of Patent: May 28, 1996

[54] APPARATUS AND METHOD FOR PROVIDING AN OCTAGONAL SHAPED OBJECT

[76] Inventor: James F. Snyder, Rte. 1, Box 72, McPherson, Kans. 67460

[21] Appl. No.: 92,784

[22] Filed: Jul. 19, 1993

[51] Int. Cl.$^6$ .................................................. G01B 3/02
[52] U.S. Cl. .................. 33/494; 33/476; 33/759
[58] Field of Search .................. 33/483, 486, 487, 33/494, 476, 759, 566, 1 G, 679.1, DIG. 9

[56] References Cited

U.S. PATENT DOCUMENTS

| | | | |
|---|---|---|---|
| 2,389,369 | 11/1945 | Kittleson | 33/494 X |
| 4,155,165 | 5/1979 | Gillingwater | 33/474 |
| 4,204,335 | 5/1980 | Grossman et al. | 33/476 |
| 5,230,158 | 7/1993 | Wall | 33/494 X |
| 5,251,382 | 10/1993 | Hellar | 33/487 X |

OTHER PUBLICATIONS

*Engineering Drawing*, 1958, McGraw–Hill Book Company, pp. 72–74.
*Engineering Drawing and Graphic Technology*, French et al., 1972, McGraw–Hill, Inc. pp. 24–25, 73–74.

*Primary Examiner*—Christopher W. Fulton
*Attorney, Agent, or Firm*—John R. Flanagan

[57] ABSTRACT

A method and apparatus to aid a craftsman in producing an eight-sided geometrical object, preferably an octagon, from a square object or rectangular object. The apparatus of the invention comprises a rule with a first edge and a first scale along the first edge, and a second edge and a second scale along the second edge. The second scale is preferably fractionally proportionate to the first scale by a factor of about 29.289322 percent. The first scale may be any standard measuring scale such as inches or centimeters. The method of the invention comprises measuring a length of the square with the first scale, using the second scale for easily measuring and marking a plurality of points on the square, and drawing a plurality of lines between the points for marking portions of the square which are to be cut off in producing an octagon or other geometrical object.

6 Claims, 5 Drawing Sheets

APPARATUS AND METHOD FOR PROVIDING AN OCTAGONAL SHAPED OBJECT

1. FIELD OF THE INVENTION

This invention generally relates to a measuring apparatus and method. More specifically, this invention provides a method and apparatus for easily measuring, marking and cutting portions of a pair of opposed sides of a square or rectangle such that a triangular shaped side is formed on each of the opposed sides of the square or rectangular to produce an octagon from the square or rectangular.

2. DESCRIPTION OF THE PRIOR ART

A patentability search was conducted and the following U.S. Patents were discovered: U.S. Pat. No. 935,067 to Taylor; U.S. Pat. No. 967,561 to Robbins; U.S. Pat. No. 1,001,316 to Smith; U.S. Pat. No. 4,641,435 to Brown; U.S. Pat. No. 4,696,110 to Walker et al; and U.S. Pat. No. 4,831,739 to Davidson. None of the foregoing prior art U.S. Patents teach or disclose the particular apparatus and/or method of the present invention.

SUMMARY OF THE INVENTION

The present invention accomplishes its desired objects by broadly providing an apparatus for aiding in the production of an eight-sided geometric object, preferably an octagonal object, from a square or rectangular object. The apparatus comprises a rule (or tape measure) having a top, a first edge, and a second edge. The first edge comprises a first scale and the second edge comprises a second scale. The first scale comprises a plurality of first measuring indicia and a plurality of first intervals disposed therebetween such that one of the first intervals is interposed between two of the first measuring indicia. Likewise, the second scale comprises second measuring indicia and second intervals therebetween such that each second interval is interposed between two of the second measuring indicia.

The present invention further accomplishes its desired objects by broadly providing a method for producing an eight-sided geometric object, preferably an octagonal object, from a square object comprising the steps of:

(a) providing a square with four (4) equal sides and with four (4) corners;

(b) finding a side length of one of the sides of the square;

(c) marking a first point on a first side of the square such that the first point is a predetermined percent (preferably about 29.289322 percent) of the side length of the square as taken from a first corner of the square;

(d) marking a second point on a second side of the square such that the second point is a predetermined percent (preferably about 29.289322 percent) of the side length of the square as taken from the first corner of the square;

(e) drawing a first line segment that intersects the first point and the second point;

(f) marking a third point on the second side of the square such that the third point is a predetermined percent (preferably about 29.289322 percent) of the side length of the square as taken from a second corner of the square;

(g) marking a fourth point on a third side of the square such that the fourth point is a predetermined percent (preferably about 29.289322 percent) of the side length of the square as taken from the second corner of the square;

(h) drawing a second line segment that intersects the third point and the fourth point;

(i) marking a fifth point on the third side of the square such that the fifth point is a predetermined percent (preferably about 29.289322 percent) of the side length of the square as taken from a third corner of the square;

(j) marking a sixth point on a fourth side of the square such that the sixth point is a predetermined percent (preferably about 29.289322 percent) of the side length of the square as taken from the third corner of the square;

(k) drawing a third line segment that intersects the fifth point and the sixth point;

(l) marking a seventh point on a fourth side of the square such that the seventh point is a predetermined percent (preferably about 29.289322 percent) of the side length of the square as taken from a fourth corner of the square;

(m) marking an eight point on the first side of the square such that the eight point is a predetermined percent (preferably about 29.289322 percent) of the side length of the square as taken from the fourth corner of the square;

(n) drawing a fourth line segment that intersects the seventh point and the eight point; and (o) cutting the square along the first, the second, the third, and the fourth line segments and removing the four corners to produce an eight-sided geometric object (i.e. an octagonal object).

It is therefore an object of the present invention to provide an apparatus and method for producing an eight-sided geometric object.

These, together with the various ancillary objects and features which will become apparent to those skilled in the art as the following description proceeds, are attained by this novel apparatus and method for providing an octagonal shaped object, a preferred embodiment as shown with reference to the accompanying drawings, by way of example only, wherein;

DETAILED DESCRIPTION OF THE INVENTION

Figures 1, 2:
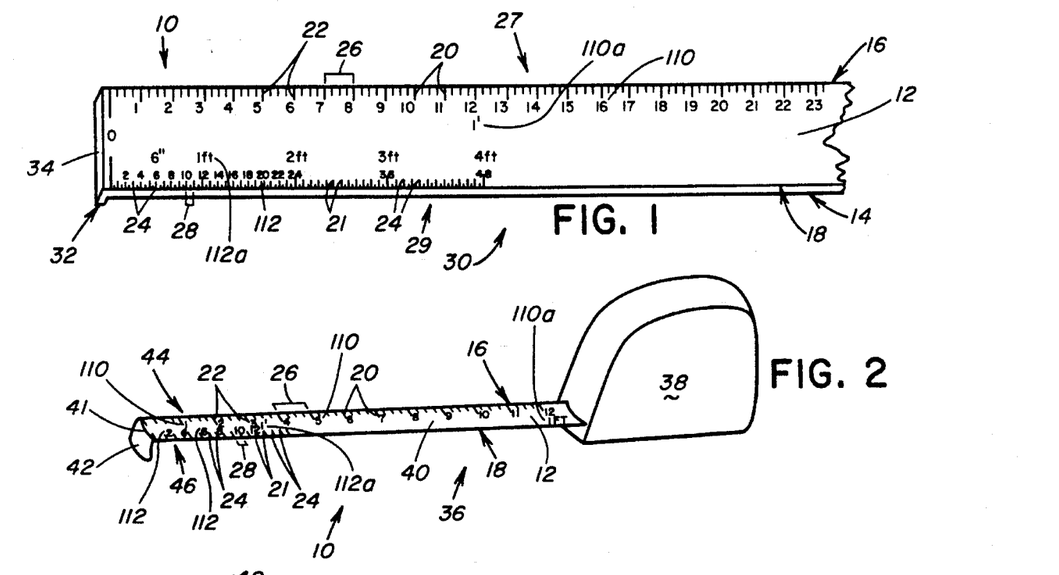
FIG. 1 is a perspective view of one embodiment of the rule of the invention in the form of a ruler with a lip member attached to one end and showing the two measuring scales of the invention on the top.
FIG. 2 is a perspective view of another embodiment of the rule of the invention in the form of a retractable metal tape measure which shows the two measuring scales of the invention on the top.
Figure 12:
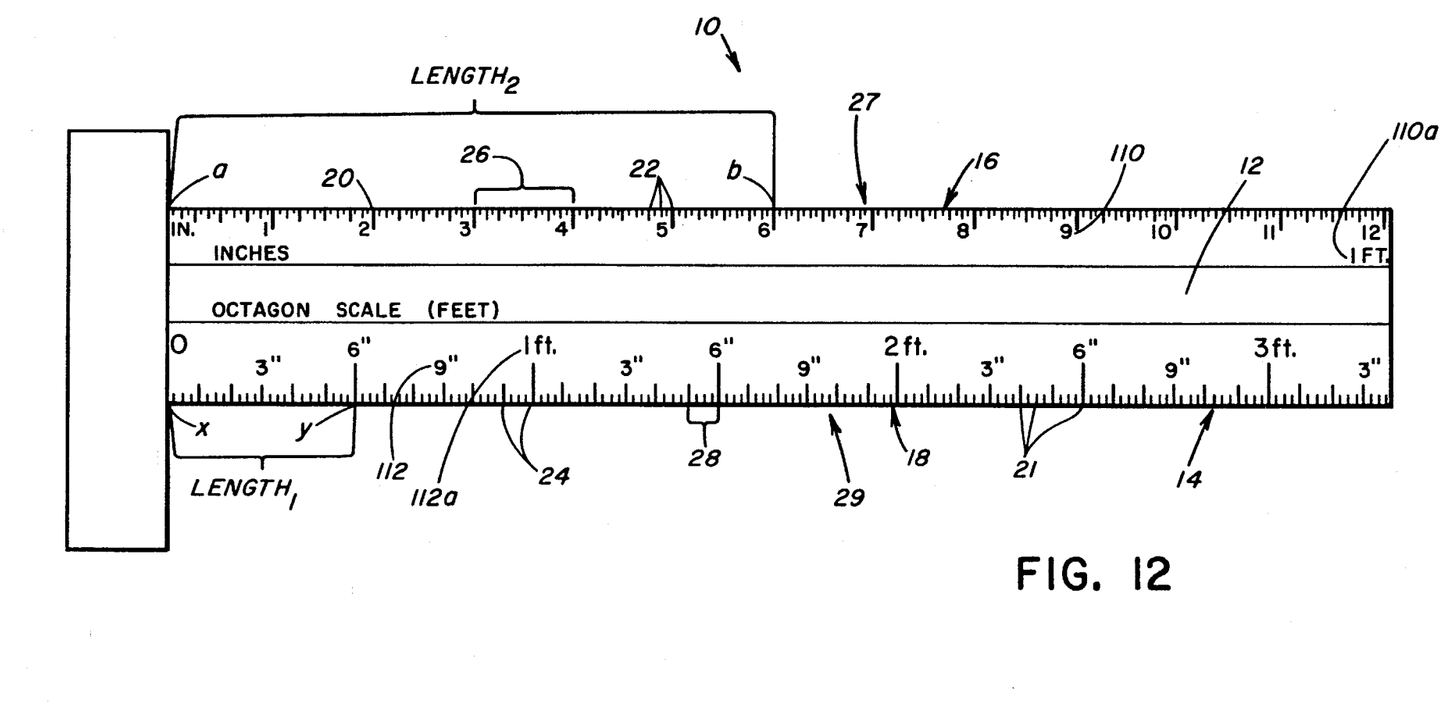
FIG. 12 is a partial top plan view of a linear edge of a rule having octagon forming indicia (or scale) therealong.

Turning now to the drawings wherein like parts of the invention are identified by like reference numerals, there is seen, as shown in FIGS. 1 and 12, a rule, generally illustrated as 10. The rule 10 comprises a top 12, a bottom 14, a first side edge 16 and a second side edge 18. Rule 10 may include, but is not limited to, any of the embodiments depicted in FIGS. 1–4. The rule 10 is used in marking a piece of material (such as a board or sheet of plastic) that is square or rectangular in shape for easily producing an octagon. Rule 10 has first measuring indicia 20 on top 12 such that first measuring indicia 20 extend along the first side edge 16. The first measuring indicia 20 comprise a plurality of marks 22 disposed on top 12 and along first side edge 16 such that the marks 22 are written, placed, painted, etc., thereon with regular first intervals 26 therebetween. The combination of the first measuring indicia 20 and the first intervals 26 therebetween comprise a first scale 27. The first scale 27 may be any one of the standard measuring scales, such as feet and fractions thereof, or meters, decimeters, centimeters, etc.

Additionally, second measuring indicia 24 are disposed on top 12 of the rule 10 along the second side edge 18. The second measuring indicia 24 comprise another plurality of marks 21 written, placed, painted, etc., thereon with regular second intervals 28 therebetween. In a similar fashion, the combination of the second measuring indicia 24 and the second intervals 28 therebetween comprise a second scale 29. The second intervals 28 space the second measuring indicia 24 apart at a predetermined fraction of the spacing of the first intervals 26; specifically, the second intervals 28 space the second measuring indicia 24 apart such that the second intervals 28 are preferably about 29.289322% of the first intervals 26. Stated alternatively, the length of each second interval 28 of scale 29 is preferably about 29.289322 percent of the length of each first interval 26 of first scale 27. Thus, in FIG. 12 the actual length "Length$_1$" from x to y (i.e. from "0" to "6") along edge 18 of second scale 29 is approximately 29.289322% of the actual length "Length$_2$" from a to b (i.e. from "0 in." to "6 in") along edge 16 of first scale 27. Thus, it can be seen that the second scale 29 is proportional to the first scale 27, or about 29.289322% of the first scale 27.

Figure 6:
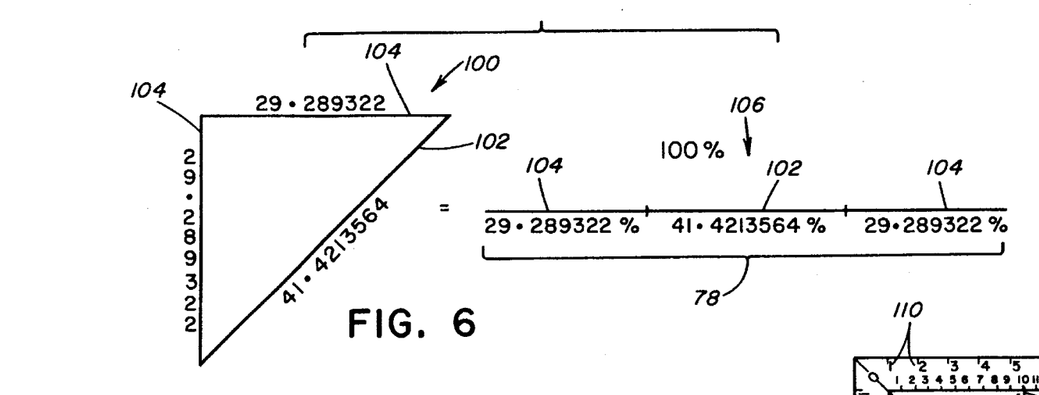
FIG. 6 is a schematic diagram disclosing the mathematical relationship of the length of a square to the sides of a triangular portion that is to be removed from a corner of the square, where the straight line in the right of FIG. 6 represents the length of a side of the square.

FIG. 6 shows mathematical relationships as they relate to the second measuring indicia 24, and the second scale 29 formed therefrom. According to Pythagorean's theorem, the square of the length of a hypotenuse 102 of a right triangle 100 is equal to the sum of the squares of its sides 104; or, $(\text{side } 104)^2+(\text{side } 104)^2=(\text{hypotenuse } 102)^2$. Since the sides 104 of the triangle are of equal length, the length of the sides 104 can be found, as they relate to hypotenuse 102. In FIG. 6 this relationship is depicted schematically in a straight line 106, wherein sides 104—104 and hypotenuse 102 of triangle 100 are shown endpoint to endpoint (in line 106). Given that the perimeter of triangle 100 equals 100% of the length of the perimeter, the length of each side 104 of the triangle equals about 29.289322% of the length of the perimeter, and hypotenuse 102 of the triangle equals about 41.4213564% of the length of the perimeter. Thus, if the perimeter of the triangle is one hundred feet, then each side 104 is equal to about 29.289322 feet and the hypotenuse 102 is equal to about 41.4213564 feet, or about $(29.289322)^2+(29.289322)^2=(41.4213564)^2$. For the purpose of this invention, line 106 represents one side of a square 70, (See FIG. 7) with mark C having a measure of about 29.289322% of the length of one of the sides of the square 70, as measured from the corner 72 of the square 70. A triangular shaped portion 74 of the corner 72 that is to be removed from square 70 to form an octagon, has sides 76 which are each equal to about 29.289322% of a length of one of the sides of the square 70. Since the proportion 29.289322% is constant (e.g. a linear function), the second measuring indicia 24 and second intervals 28 disposed on rule 10 are formed from any useful or standard measuring scale (such as inches or centimeters) which is reduced by that percentage. Stated alternatively, the triangular portion 74 that is to be removed from square 70 has sides which are about 29.289322% of the length of one of the equal sides of the square 70. Since this is a constant proportion (i.e. changes in direct proportion as the length of the sides of square 70 changes), rule 10 may be constructed with second scale 29 that is formed with second measuring indicia 24 and second intervals 28, wherein the second intervals 28 are about 29.289322% of the first intervals 26. As previously indicated, the actual (representative) measuring length between second intervals 28 are about 29.289322% of the actual (representative) measuring length between the first intervals 26. Thus, the second measuring indicia 24 of scale 29 on rule 10 are marked thereon with the second intervals 28 being spaced at about 29.289322% of the first intervals 26, and the second indicia 24 are disposed on top 12 of rule 10 at second intervals 28 which are about 29.289322% of the first intervals 26 between the first indicia 20 of scale 27. By way of example, the actual length on edge 18 from "0" to "1 ft" is approximately 29.289322% of the actual length on edge 16 of from "0" to "12 inches" (see FIG. 12). The number about 29.289322 as used in the specification and the claims is equal to about 29.3, and the number about 41.4213564 as used in the specification and the claims is equal to about 41.4. Stated alternatively (see FIG. 6), each side 104 has a length equal to about the square root of ((length of hypotenuse 102)$^2$–(length of side 104)$^2$). Stated alternatively further, assuming that the total percent length of the side 78 of the square 70 in FIG. 7 equals 100%, the length of the side 76 of the triangular portion 74 is about 29.289322% or about 29.3% and the length of the portion between any two marks 80—80 is about 41.4213564%, or about 41.4%.

Figure 8:
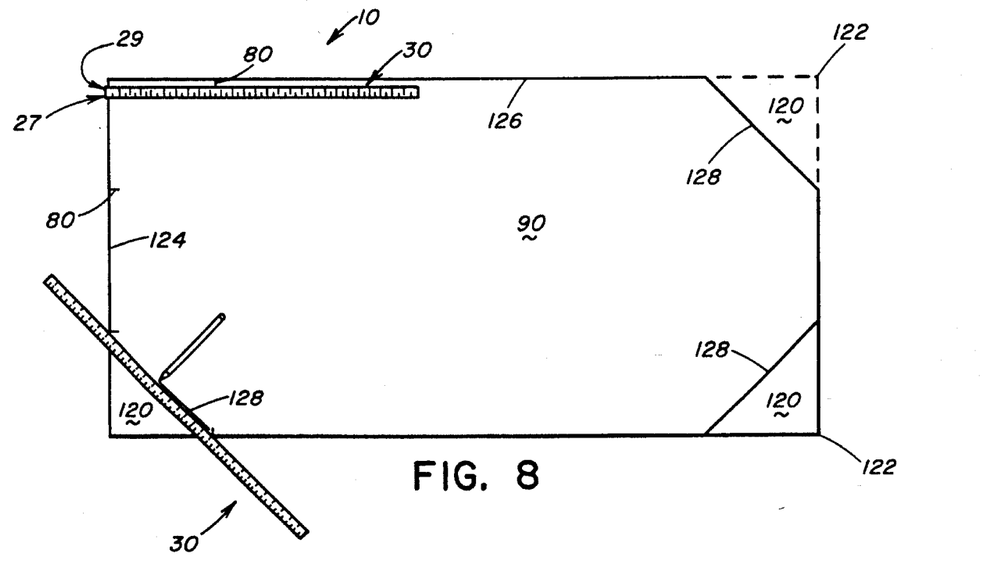
FIG. 8 is a top plan view of a rectangular object (e.g. a wooden board) with one or both ends having a ½ octagon shape; that is, the rectangular object is to be formed into a geometric octagon figure having six (6) equal sides wherein each opposed end has three (3) sides of equal length.

Rule 10 may be formed from any one of several embodiments, any one of which is equally effective in executing or performing the method of this invention. FIG. 1 discloses a ruler 30 which may optionally have a lip member 32 secured to one end 34 to aid the craftsman in easily positioning the ruler 30 when measuring. Ruler 30 has first measuring indicia 20 on top 12 such that first measuring indicia 20 extend along first side edge 16. The first measuring indicia 20 comprise the plurality of marks 22 disposed on top 12 and along first side edge 16 such that the marks 22 are written, placed, painted, etc., thereon with regular first intervals 26 therebetween. The combination of the first measuring indicia 20 and the first intervals 26 therebetween comprise the first scale 27. The first scale 27 may be any one of the standard measuring scales as noted above, such as feet and fractions thereof, or meters, decimeters, centimeters, etc. Additionally, the second measuring indicia 24 are disposed on top 12 of the rule 10 along the second side edge 18. The second measuring indicia 24 comprise the plurality of marks 21 written, placed, painted, etc., thereon with regular second intervals 28 therebetween. In a similar fashion, the combination of the second measuring indicia 24 and the second intervals 28 therebetween comprise the second scale 29. As represented in FIG. 12, the second intervals 28 space the second measuring indicia 24 apart at a predetermined fraction of the spacing of the first intervals 26 on the first measuring indicia 20; more specifically, the second intervals 28 are spaced apart at a distance in the second measuring indicia 24 such that the length/distance of the second intervals 28 are about 29.289322% of the length/distance of the first intervals 26. FIG. 8 shows the ruler 30 in use, wherein ruler 30 is disposed on a rectangular object 90 for the purpose of measuring said rectangle 90, marking said rectangle 90, and cutting the corners of said rectangle 90 for producing an eight-sided object therefrom.

Figure 9:
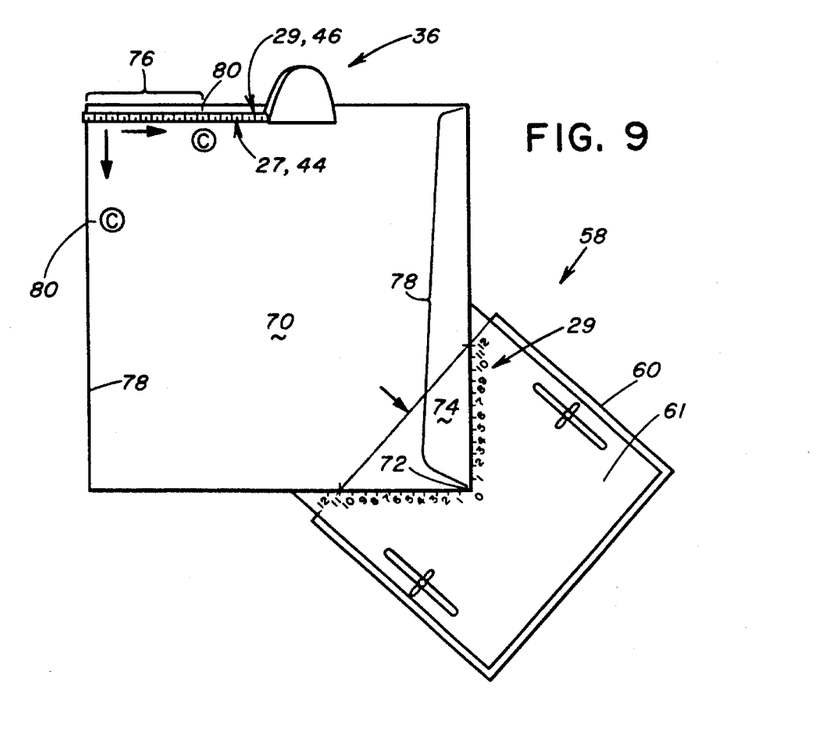
FIG. 9 is a top plan view of a square object with one corner being engaged with a carpenter's jig having the octagon scale on top, and the opposed corner being measured by the tape measure of FIG. 2, to commence the formation of a geometric octagon figure.

Rule 10 may be formed or manifested from any one of well known type measuring rulers in the art, such as in FIG. 2. FIG. 2 discloses a retractable metal tape measure 36 comprising a case 38, a retractable metal measuring tape 40, and a lip member 42 secured to an end 41 of tape 40. Disposed on tape 40 is any standard measuring scale 44, such as feet or meters, and/or fractions thereof, such as inches or centimeters, and the octagon scale 46 of this invention. As described above, octagon scale 46 is formed by reducing the standard scale 44 to about 29.289322 percent of the standard scale 44. Metal tape measure 36, when used for the purpose of this invention comprises rule 10, which is embodied as the tape 40 of the retractable metal tape measure 36 shown in FIG. 2. Stated alternatively, the metal tape 40 is formed with first scale 27 and second scale 29 of rule 10. As previously mentioned, rule 10 has first measuring indicia 20 on top 12 such that indicia 20 extends along first side edge 16. The first measuring indicia 20 comprises the plurality of marks 22 disposed on top 12 and along first side edge 16 such that the marks 22 are written, placed, painted, etc., thereon with regular first intervals 26 therebetween. The combination of the first measuring indicia 20 and the first intervals 26 therebetween comprise the first scale 27. The first scale 27 may be any one of the standard measuring scales as noted above, such as feet and fractions thereof, or meters, decimeters, centimeters, etc. Additionally, the second measuring indicia 24 are disposed on top 12 of the rule 10 along the second side edge 18. The second measuring indicia 24 comprises the plurality of marks 21 written, placed, painted, etc., thereon with regular second intervals 28 therebetween. In a similar fashion, the combination of the second measuring indicia 24 and the second intervals 28 therebetween comprise the second scale 29. The second intervals 28 space the second measuring indicia 24 apart at a predetermined fraction of the spacing of the first intervals 26; specifically, the second intervals 28 space the second measuring indicia 24 apart such that the second intervals 28 are about 29.289322% of the first intervals 26. FIG. 9 depicts the retractable metal tape measure 36 disposed on square 70 for the purpose of measuring, marking, and cutting the square 70 to produce an octagon therefrom.

Figures 3, 3A, 3B:
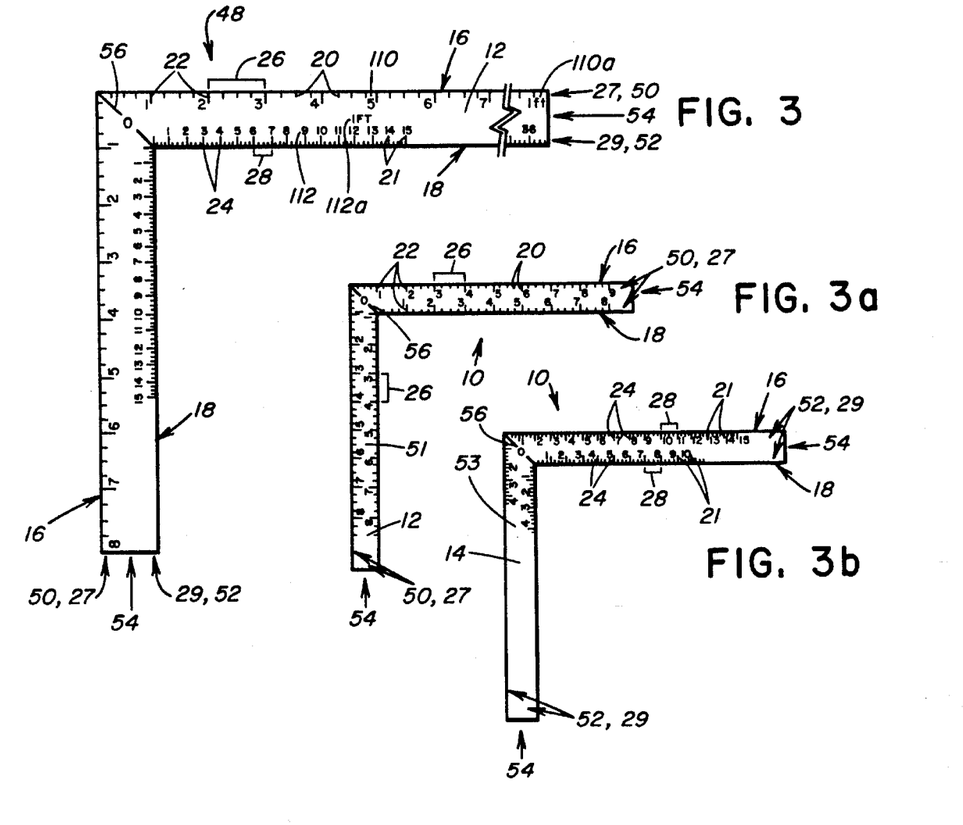
FIG. 3 is a perspective view of yet another embodiment of the rule of the invention in the form of a carpenter's square showing the two measuring scales of the invention on the top.
FIG. 3a is a top plan view of the carpenter's square having the standard scale marked on the top face.
FIG. 3b is a bottom plan view of the carpenter's square having the octagon scale marked on the bottom face.
Figure 10:
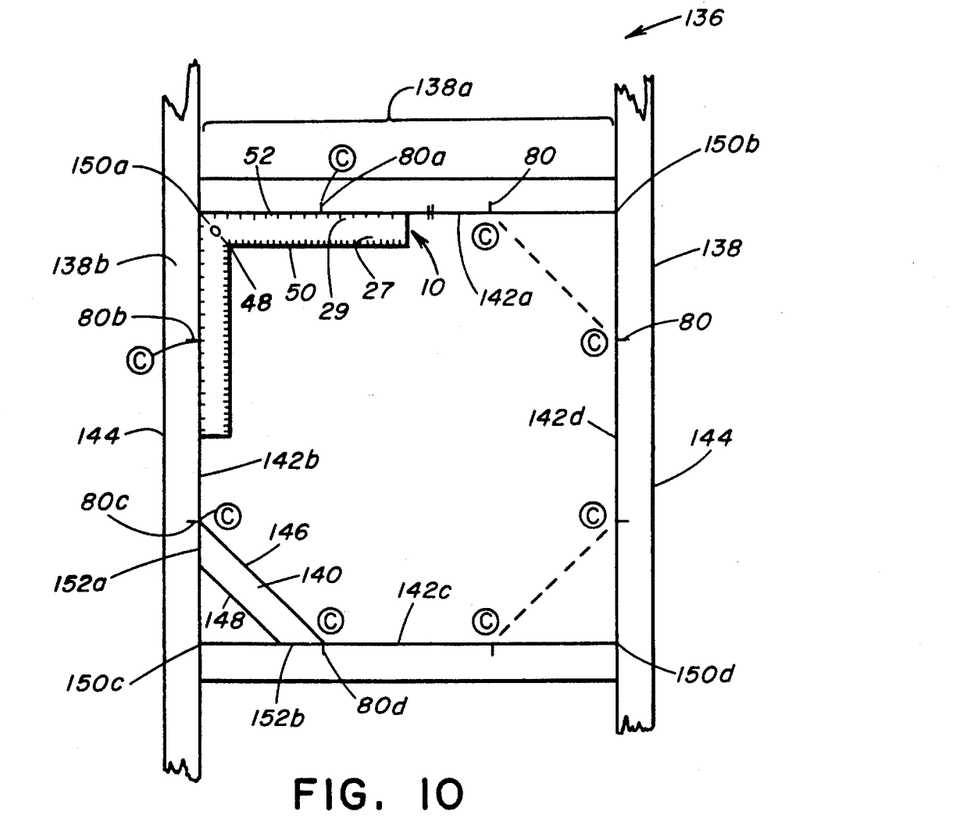
FIG. 10 is a top plan view of an octagon scale in the form of the carpenter's square circumscribing a square object to commence the production and/or formation of a geometric octagon figure.

In another embodiment, rule 10 may take the form of a carpenter's square 48 as shown in FIGS. 3, 3a, and 3b. The carpenter's square 48 comprises a pair of ruler members 54—54, each one having one end that is secured to the other ruler member 54 at intersection 56 such that the combination of the ruler members 54—54 defines a structure that is generally L-shaped. Intersection 56 secures the ruler members 54—54 to each other such that each ruler member 54 comprises a 45 degree angle at intersection 56. As shown in FIG. 3, each ruler member 54 has a standard measuring scale 50 (i.e. the first scale 27), such as inches, meters, etc., which has a zero starting point at the intersection of the two ruler members 54—54. In a similar fashion, each of the ruler members 54—54 of the carpenter's square 48 additionally comprise an octagon scale 52 (i.e. the second scale 29) of this invention, with the zero point of the octagon scale 52 located at the intersection of the ruler members 54—54. As described in the embodiment above, each ruler member 54 has first measuring indicia 20 on top 12 such that first measuring indicia 20 comprise the plurality of marks 22 disposed on top 12 and along first side edge 16 such that the marks 22 are written, placed, painted, etc., thereon with regular first intervals 26 therebetween. The combination of the first measuring indicia 20 and the first intervals 26 therebetween comprise the first scale 50 (i.e. the first scale 27). The first scale 50 may be any one of the standard measuring scales as noted above, such as feet and fractions thereof, or meters, decimeters, centimeters, etc. Additionally, again as noted above, the second measuring indicia 24 are disposed on top 12 of each ruler member 54 along the second side edge 18. The second measuring indicia 24 comprise the plurality of marks 21 written, placed, painted, etc., thereon with regular second intervals 28 therebetween. In a similar fashion, the combination of the second measuring indicia 24 and the second intervals 28 therebetween comprise the second scale 52 (i.e. the second scale 29). The second intervals 28 space the second measuring indicia 24 apart at a predetermined fraction of the spacing of the first intervals 26; more specifically, the second intervals 28 space the second measuring indicia 24 apart such that the second intervals 24 are about 29.289322% of the first intervals 26. In an alternate embodiment of the carpenter's square 48 shown in FIGS. 3a and 3b, the carpenter's square has the standard scale 50 (i.e. the first scale 27) on a first face 51 (FIG. 3a) and the octagon scale 52 (i.e. the second scale 29) on a second face 53. Thus, the standard scale 50 may be on one side (first face 51) of the carpenter's square along first side edge 16 and/or second side edge 18 and the octagon scale 52 may be on the other side (second face 53) along first side edge 16 and/or second side edge 18. FIG. 10 discloses the use of the carpenter's square 48 as used to mark a square frame 136 for the placing of a additional side member 140. A plurality of additional side members 140 is used to form an octagon, or half-octagon, from square frame 136, such as in the frame of an octagonal doorway 134 (see FIG. 11).

Figure 4:
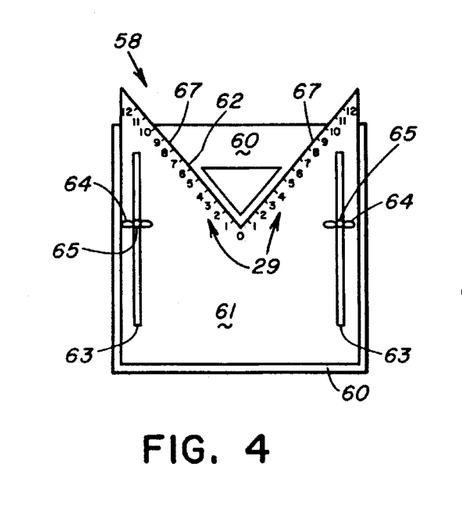
FIG. 4 is a top plan view of still another embodiment of the rule of the invention in the form of a carpenter's jig which shows the octagon scale on the top.
Figure 5:
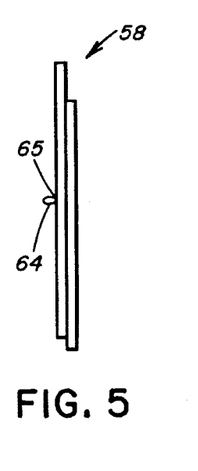
FIG. 5 is a side elevational view of the carpenter's jig showing the two plate members that comprise the jig.

In yet another embodiment, the measuring device which comprises rule 10 may take the form of a jig 58 of the type typically constructed by a carpenter for the purpose of quickly measuring a plurality of items, as shown in FIGS. 4 & 5. The jig 58 shown in FIG. 4 by way of example only comprises a first plate member 60, typically, but not exclusively, formed of flat lumber stock, plastic, or metal and a second plate member 61 formed in a similar fashion to the first plate member 60. The second plate member 61 has a triangular cutout 62 in one side such that the corner of a square article, such as a board, may be slidably disposed thereto. Second plate member 61 additionally has a pair of elongated cutouts 63—63 disposed therein, for slidably receiving a bolt member 65. A pair of bolt members 65—65 are secured to first plate member 60, and second plate member 61 is disposed thereon such that bolt members 65—65 protrude through elongated cutouts 63—63. A pair of wing nuts 64—64 rotatably engage bolt members 65—65 and secure second plate member 61 to first plate member 60. The triangular cutout 62 of jig 58 comprises a 90 degree angle and preferably has the second measuring indicia 24 of the second scale 29 written, painted, marked, etc. on a pair of edges 67—67 for easily measuring and locking the jig 58 into position. It is to be understood that the jig 58 may comprise an alternate method for securing the first plate member 60 to the second plate member 61, such as a frictional groove, without departing from the spirit of the invention. FIG. 9 shows the use of the carpenter's jig 58, wherein the jig 58 is disposed on one corner 72 of square 70 for the purpose of marking said square 70 in the process of producing on octagon therefrom.

Figure 7:
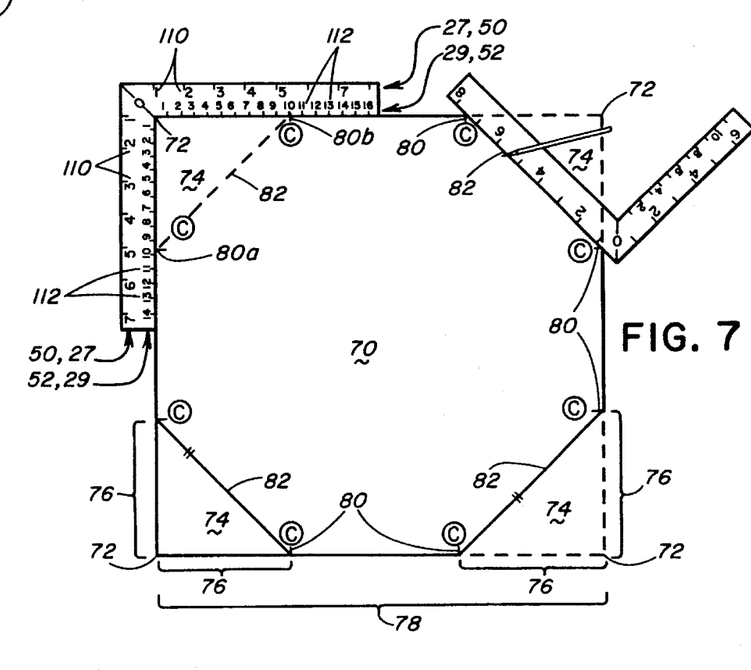
FIG. 7 is a top plan view of a square showing each corner of the square marked for cutting out a triangular portion in producing an octagon therefrom, and the process of marking the square.

With continuing reference now to the drawings for operation and use of the invention by way of example only, there is seen in FIG. 7 square 70 which is provided for the purpose of producing an octagon therefrom. Square 70 may be made of any suitable material that an octagon may be produced from, or any material that may be suitably machined or worked for the process of producing an octagon. The process of producing an octagon from square 70 first comprises determining the length of a side 78 by providing rule 10 with top 12, first edge 16 with first scale 27 written, marked, etc. thereon, and second edge 18 with second scale 29 written, marked, etc. thereon. The process continues by measuring the length of the side 78 of square 70 with the standard scale 27 of rule 10. Stated alternatively, rule 10 is provided for the purpose of measuring the length of the side 78 of square 70. For this purpose, rule 10 is provided with the first scale 27. As previously indicated, the first scale 27 comprises the first measuring indicia 20 and the first intervals 26 as described above. First scale 27 additionally comprises first numerical indicia 110 (see FIG. 12) disposed thereon which correspond to the first measuring indicia 20. The first numerical indicia 110 are typical arabic numerals increasing incrementally by a factor of one, and are well known in the art for measuring devices, such as rulers or gauges. In forming an octagon from square 70 (see FIG. 7), triangular portions 74 having sides 76 are to be removed therefrom by cutting with a saw, blade, etc. For the purpose of determining the length of the sides 76 of the triangular portion 74, the rule 10 is provided with the second scale 29. The second scale 29 comprises the second measuring indicia 24 and the second intervals 28. Second scale 29 additionally comprises second numerical indicia 112 (see FIG. 12), disposed thereon which correspond to the second measuring indicia 24. The second numerical indicia 112 are typical arabic numerals increasing incrementally by a factor of one, and are well known in the art for measuring devices, such as rulers or gauges. The second numerical indicia 112 of the second scale 29 correspond directly by reference to the arabic numerals of the first numerical indicia 110 of first scale 27. In other words, first numerical indicia 110 and second numerical indicia 112 are cardinal numbers which relate directly to each other, such that "1 foot" (110a) of scale 27 relates to "1 ft" (112a) of scale 29 and so forth. Thus, after measuring and delineating the length of the sides 78 on each side of square 70 (see FIG. 7), the process of producing an octagon therefrom continues by disposing rule 10 sequentially along each corner 72—72—72—72 and extending along sides 78, and marking the sides 76 of the triangular portion 74 that is to be removed from square 70. A plurality of marks 80, at the point of second scale 29 that corresponds to the arabic numeral as measured on first scale 27, are marked, written, etc., on square 70. Stated alternatively, by way of example, rule 10 is disposed on square 70, for the purpose of measuring said square 70, with first scale 27. As noted above, first scale 27 may be any one of the standard measuring scales, or an arbitrary measuring scale. After measuring the side 78 of the square 70 the measurement is noted. If, for example, the side 78 of square 70 measures 4 units, the number "4" is found on the second scale 29 (the "octagon scale"), which is a scale that is about 29.289322% in proportion to the first scale 27 (the standard scale), of rule 10 and marks 80 are disposed on the square 70, as a carpenter would measure and mark any material he would be working with. The number "4" on the second scale 29 represents about 29.289322% of the "4" units of the first scale 27 (in this example). The proportion (29.289322%) of "4" units corresponds to the length of the side 76 of the triangular portion 74 necessary to be cut away to form a symmetrical octagon. The process is repeated for each corner 72 of square 70 such that upon completion of the marking process, each side 78 of the square 70 has two marks 80—80 thereupon.

After marks 80—80—80—80—80—80—80—80 have been disposed on square 70, the process continues by using any straightedge, such as rule 10, for drawing a line 82 between mark 80a and mark 80b (see FIG. 7) such that line 82 defines the hypotenuse of the triangular portion 74 to be removed. Then, by using an appropriate cutting tool, such as a saw, the triangular portion 74 is removed therefrom. The process is repeated for the remaining three corners 72 of square 70.

Thus, rule 10 is provided with second scale 29 for determining the length of the sides 76 of a triangular portion 74 that, upon removal, produce an octagon. Rule 10 has standard measuring first scale 27 and fractionally proportionate second scale 29 to assist the craftsman in easily marking the square 70 as described above.

It is to be understood that the invention is not intended to only produce an octagon from a square object. In another use of the invention, given by way of example, a rectangle 90 (see FIG. 8) is provided. A polygon having an end comprising at least three adjacent equal sides is to be produced from rectangle 90. Alternatively, the polygon may have a pair of ends, each comprising three adjacent equal sides. The use of the scale is similar to the method described above. Referring then to FIG. 8 for a further use of the invention, rule 10, in the embodiment of ruler 30, is first disposed on rectangular object 90 for the purpose of measuring the length of a short side 124 of rectangle 90. Rectangle 90 is to have triangular portions 120—120 removed therefrom in the process of producing a five, six, seven or eight-sided polygon from rectangle 90. The measure of side 124 is noted by referring to the first scale 27 of rule 10. Rule 10 is subsequently disposed along short side 124 for the purpose of marking thereon marks 80 used for delineating a portion 120 that is to be removed therefrom in the process of producing a polygon therefrom. This time the second scale 29 is used to determine where marks 80 are to be written, painted, scraped, etc on rectangle 90. The measure, as noted in the measurement of the side 124 with scale 27 above, is located on the second scale 29 and mark 80 is then written, etc. on rectangle 90 at the point along second scale 29 that corresponds to the measurement, as taken above from first scale 27. The process is repeated, then, by disposing rule 10 along a long side 126 adjacent to short side 124 of rectangle 90 and disposing a mark 80 on rectangle 90 at the same point on second scale 29 that was used in marking short side 124. Ruler 30 is then disposed on rectangle 90 such that it intersects marks 80—80 and a generally straight line 128 is marked, written, scribed, etc along ruler 30 such that said line 128 intersects marks 80—80. Line 128 delineates the triangular portion 120 that is to be cut away in producing the polygon from rectangle 90. The triangular portion 120 is then cut away with a saw or similar cutting device as necessary to cut the material from which the rectangular object 90 is formed.

The process is then repeated for each corner 122 of rectangle 90, subsequently to produce a five-sided, six-sided, seven-sided, or eight-sided polygon therefrom. Each corner 120 of rectangle 90 may have marks 80—80 marked thereon along each side 124–126 that extend from any corner 122. Straight line 128 is subsequently marked on rectangle 90 thereby delineating the triangular portion 120 that is to be removed, as desired.

Figure 11:
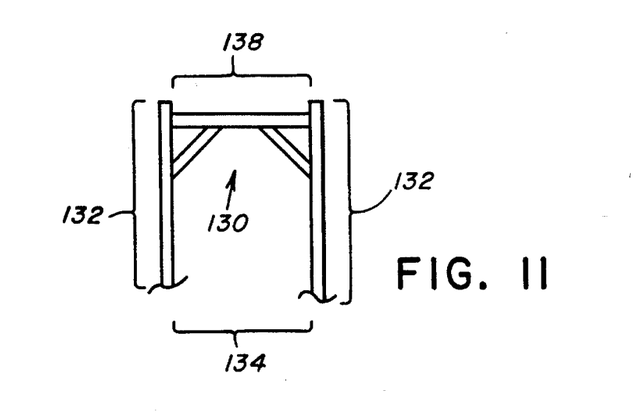
FIG. 11 is a partial front elevational view of a top of a door which commenced with a rectangular shaped frame for producing a geometric shaped frame having a top with three (3) sides that are equal.

In an alternative application of the invention, a square frame 136 is provided (see FIG. 10) for the purpose of forming an octagon by securing a plurality of additional side members 140, having outer edges 148 to the square frame 136. The octagon produced may be used in a variety of manners, such as for framing an arch 130 of a doorway 134 as shown in FIG. 11, wherein a partial octagon is used to form said arch 130. The process of measuring and marking the square frame 136 is similar to the process of forming an octagon as described in the preceding discussion. The first scale 27 of rule 10 is employed to find the length of a side 138, having an inner edge 142a and an outer edge 144, of square frame 136, measured from an inner edge 142a of side 138. Since the sides of square are of equal length, it is not important to measure any one side over another. However, if one side is longer than another, such as in the case of a rectangle, or in a partial rectangle or square, the side used for measuring in determining a length should be the side to which the additional side members 140—140 are to be added. Stated alternatively by way of example in reference to FIG. 11, if additional side members 140—140 are to be added to doorway 134 having opposed sides 132 and side 138, the length of side 138 is found and referred to when determining the length of an inner edge 146 of the additional side member 140 that is to be added thereto, since said side 138 is the side to which the additional side members 140—140 are to be added to. Referring again to FIG. 10, one corner 150a of the square frame 136 wherein the length of the inner edge 142a of side 138a is found using first scale 27, or any standard measuring scale to which there is a corresponding second scale 29 (which comprises the octagon scale of this invention). The length of the inner edge 142a of side 138a is noted and rule 10, embodied in FIG. 10 as a carpenter's square 48 is disposed on the inner edge 142 and, using second scale 29, mark 80a is placed on the inner edge 142a of side 138a at the point C which corresponds to the measurement noted above. Rule 10 is then disposed along inner edge 142b of side 138b and mark 80b is placed on the inner edge 142b of side 138b at the point C which corresponds to the measurement noted above. Additional side member 140 is then cut such that an inner edge 146 of side member 140 connects marks 80c–80d at an intersection 152a of inner edge 142b and intersection 152b of inner edge 142c. The process is repeated for each corner of the square frame 136. Square frame 136 may be any type of frame used in construction from which an octagonal shape, or partial octagonal shape may be desired.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A measuring apparatus for measuring sides of a square and marking sides of the square to substantially produce an octagon from the square, said measuring apparatus comprising:

(a) a rule having a first edge, a second edge, a first graduated square scale disposed on said rule along said first edge thereof for measuring and numerically reading the lengths of the sides of the square, and a second graduated octagon scale disposed on said rule along said second edge thereof for finding and marking lengths of equal sides of the octagon on the sides of the square by locating on said second graduated scale the same numerical lengths as measured by and read from said first graduated scale;

(b) said first graduated square scale, representing respective lengths of equal sides of squares, comprising a plurality of first measuring indicia disposed on said rule along said first edge thereof and a plurality of first intervals being equivalent in length to one another and interposed between said first measuring indicia such that any one of said first intervals is interposed between any adjacent pair of said first measuring indicia;

(c) said second graduated octagon scale, representing lengths of equal sides of respective octagons that can be produced from respective ones of said squares, comprising a plurality of second measuring indicia disposed on said rule along said second edge thereof and a plurality of second intervals being equivalent in length to one another and interposed between said second measuring indicia such that any one of said second intervals is interposed between any adjacent pair of said second measuring indicia; and (d) each of said second intervals of said octagon scale having a length equal to about 29.3 percent of the length of each of said first intervals of said square scale such that said second graduated octagon scale is fractionally proportionate to said first graduated square scale by a factor of about 29.3 percent.

2. The apparatus of claim 1 wherein said first graduated scale additionally comprises first cardinal measuring indicia for reference thereto and said second graduated scale additionally comprises second cardinal measuring indicia for reference thereto.

3. A method for producing an eight sided geometrical object from a square object, comprising the steps of:

(a) providing a square object having a first corner, a second corner, a third corner, and a fourth corner;

(b) providing a rule having a first edge, and a second edge;

(c) providing a first graduated scale on said rule by disposing a plurality of first measuring indicia on said rule along said first edge thereof and spacing said first measuring indicia apart with a plurality of first intervals, each of said first intervals being interposed between any pair of said first measuring indicia;

(d) providing a second graduated scale on said rule by disposing a plurality of second measuring indicia on said rule along said second edge thereof and spacing said second measuring indicia apart with a plurality of second intervals, each of said second intervals being interposed between any pair of said second measuring indicia, each of said second intervals having a length equal to about 29.3 percent of the length of each of said first intervals such that said second graduated scale is fractionally proportionate to said first graduated scale by a factor of about 29.3 percent;

(e) disposing first numeric indicia on said rule corresponding to the first measuring indicia of said first scale such that said first numeric indicia increments cardinally along the first edge;

(f) disposing second numeric indicia on said rule corresponding to the second measuring indicia of said second scale such that said second numeric indicia increments cardinally along the second edge;

(g) disposing the first edge of the rule along a first side of the square and measuring the length of the first side of the square with said first scale of said rule and noting the length of the first side of the square by reading a first cardinal numeral on said first scale;

(h) disposing said ruler on said first corner of said square such that the second edge of said rule having the second scale thereon extends from the first side of the square and along a second side thereof with the first side of the square corresponding to a zero starting point of the second numeric indicia on the second scale of the rule;

(i) marking the square at a first point where a second cardinal numeral on the second scale corresponds to the first cardinal numeral read in said measuring step (g);

(j) disposing said rule on the first corner of said square such that the second edge of said ruler having the second scale thereon extends from the second side of the square and along the first side thereof with the second side of the square corresponding to the zero starting point of the second numeric indicia on the second scale of the rule;

(k) marking the square at a second point where said second cardinal numeral on the second scale corresponds to said first cardinal numeral read in said measuring step (g);

(l) marking a first line segment intersecting said first point and said second point on the square and passing adjacent to said first corner of the square;

(m) repeating said steps (h)–(l) for said second corner, said third corner, and said fourth corner of the square so as to mark a second line segment passing adjacent to said second corner of the square, a third line segment passing adjacent to said third corner of the square, and a fourth line segment passing adjacent to said fourth corner of the square; and (n) removing the first, second, third, and fourth corners of said square along the respective first, second, third, and fourth line segments thereof to produce an eight sided geometrical object.

4. The method of claim 3 wherein said removing of step (n) is carried out with cutting along said respective first, second, third, and fourth line segments.

5. The method of claim 3 wherein said marking of each of said first, second, third and fourth line segments is carried out by disposing said rule on said square such that one of said first and second edges thereof intersects said first point and said second point and passes adjacent to respective ones of said first, second, third and fourth corners of the square.

6. The method of claim 3 wherein said marking of each of said first, second, third and fourth line segments is further carried out by marking a line along said one of said first and second edges of said rule connecting said first and second points and passing adjacent to respective ones of said first, second, third and fourth corners of the square.

* * * * *